Oct. 18, 1949. R. C. ROSE 2,485,512
MANUFACTURE OF TRANSPARENT ALGINIC FILMS
Filed Dec. 19, 1947
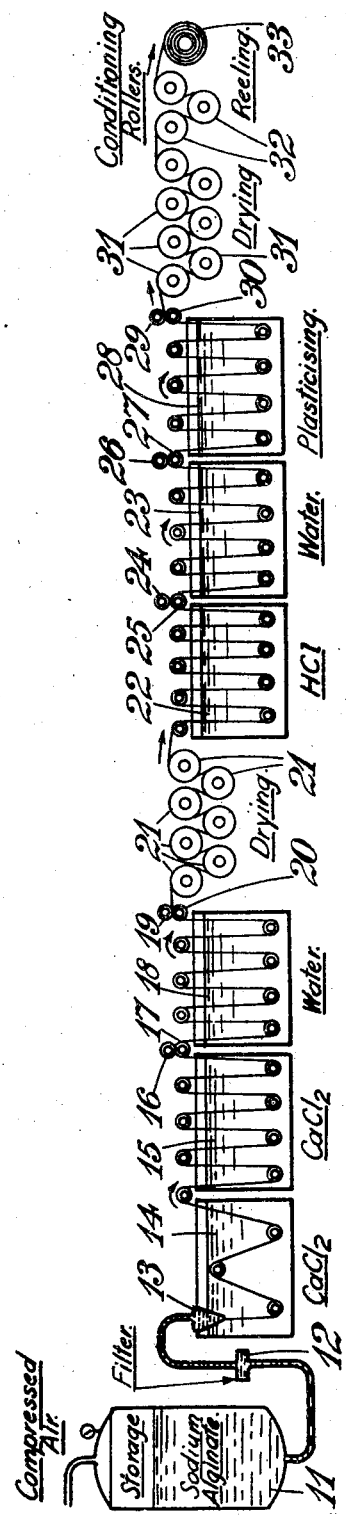
INVENTOR
ROBERT CHARLES ROSE Patented Oct. 18, 1949

2,485,512

UNITED STATES PATENT OFFICE 2,485,512

MANUFACTURE OF TRANSPARENT ALGINIC FILMS

Robert Charles Rose, Englefield Green, England, assignor to Alginate Industries Limited, Maidenhead, Berkshire, England, a British Company Application December 19, 1947, Serial No. 792,728
In Great Britain October 21, 1941

4 Claims. (Cl. 18—57)

This invention relates to the continuous high speed production of transparent alginic acid films from sodium alginate solutions. The present application is a continuation-in-part of my application Serial No. 428,561, filed January 28, 1942, now abandoned.

A process wherein sodium alginate solution is converted into a film of calcium alginate by extruding the sodium alginate solution into a calcium chloride coagulating bath and the wet film of calcium alginate is then converted directly into an alginic acid film by passing it through an acid solution can only be carried out at slow speeds. This is because the alginic acid film is not sufficiently strong to withstand the strains imposed by treatment in a high speed transparent paper machine.

I have discovered a process whereby the alginic acid film is sufficiently strong to withstand the strains imposed by treatment in high speed transparent paper machines, and accordingly by following my process alginic acid films can be made at high speeds from sodium alginate solutions. Briefly described, my process involves the following steps in combination:—

(1) A liquid film of sodium alginate solution having a proper viscosity as hereinafter more particularly described is projected into a coagulating bath of calcium chloride solution of proper concentration, whereby the sodium alginate film is converted into a film of calcium alginate.

(2) The film of calcium alginate is continuously dried until the solids content of the film is between 20 and 40% of its total weight.

(3) The partially dried calcium alginate film is continuously led through an acid bath to effect conversion to alginic acid and thereafter the alginic acid film is washed and dried.

By partially drying the calcium alginate film to the extent described, the conversion of the calcium alginate film to an alginic acid film takes place without undue weakening of the strength of the alginic acid film so that high speeds can be maintained without danger of breakage of the film in the machine.

The following is a description by way of example of one form which the process may take in accordance with the invention:

The accompanying drawing illustrates the process diagrammatically.

In the drawing, sodium alginate solution is stored under pressure of compressed air in a head tank 11 and is led through a filter 12 to a film forming hopper 13 where it is projected through a slot in the bottom of the hopper into a coagulating bath 14.

The sodium alginate solution in the head tank 11 projected through a slot in the hopper 13 consisted of a 7% solution of sodium alginate at a viscosity of 100 centipoises at 15° C. when diluted to a strength of 1%.

The concentration of sodium alginate in the sodium alginate solution should be between 6 and 8% by weight. The viscosity of the sodium alginate solution should be from 30 to 200 centipoises when tested at a concentration of 1% at 15° C. It will be understood, however, that the 6 to 8% solution actually employed has a much higher viscosity, but it is convenient to reduce all solutions for purposes of comparison and easy measurement of the viscosity to a standard of strength of 1% and the viscosity measurements stated in this specification and the claims appended thereto are measured at this standard of strength.

The calcium chloride coagulating solution in the bath 14 consisted of 5% calcium chloride and had a temperature of 20° C. The $CaCl_2$ was slightly acid having a pH of 3–4. The whole apparatus shown in the drawing is constructed as a modern high speed paper machine, the general construction of such machines being well-known in the art.

From the bath 14 the coagulated film passes into a second calcium chloride bath 15, also containing 10% calcium chloride solution. It will be appreciated that the calcium chloride solution in the first bath 14 needs to be continually replenished by the addition of fresh calcium chloride solution, and that spent solution needs to be continuously withdrawn from the bath 14 in order that the strength may be maintained constant. The purpose of the second bath 15 is to complete coagulation, and replenishment in this bath may be relatively slow.

From the bath 15 the coagulated film passes between nip rollers 16, 17 to a washing bath 18 of water which is continuously replaced to keep it fresh. From the water bath 18 the film passes through nip rollers 19, 20 which remove excess water from the surface of the film and thence round heated drying rollers 21 by which alternate sides of the film are exposed to the heated rollers and to the atmosphere.

The rollers 21 are arranged in a drying chamber, not shown in the drawing, and the rollers are arranged to be sufficient in number, in heat and in surface area to reduce the amount of water present and to increase the solid content of the film to 40% of the total weight of the film. This is equivalent to evaporating about 8/10 of the original quantity of water present. In the instance given, the film contracted 12% in width during this partial drying of the film.

The solids content of the calcium alginate film after partial drying but prior to conversion into an alginic acid film is critical and should in all cases be such that the solids content of the film after partial drying is between 20 and 40% of its total weight. Where the solids content is less than 20% the strength of the film is not sufficient to withstand the strains imposed thereon by treatment in a high speed transparent paper machine, and although the film may not actually break, stresses are set up within it which reduce the toughness of the final product. If however the film is dried in the form of calcium alginate until the concentration of solids exceeds 40% of the total weight the calcium alginate film tends to crack as it passes over the drying rollers, and furthermore the conversion reaction which takes place in the acid bath is slowed down thus introducing a new factor governing the speed at which the machine may be run which tends to annul the advantage gained by the partial drying step. I have found that by confining the solids content of the film after partial drying between the limits of 20% and 40% of the total weight it is possible to ensure that the film has sufficient strength under the normal working conditions of a high speed transparent paper machine, but nevertheless remains pliable enough to be handled at speed by the rollers without cracking and moreover reacts rapidly with the acid in the conversion bath.

The partially dried film from the rollers 21 is passed into an acid conversion bath 22 which in the instance under consideration consisted of hydrochloric acid in a strength of 2% and at a temperature of 20° C. In this bath the film is converted from calcium alginate to alginic acid and the bath gradually accumulates a content of calcium chloride. The strength of the bath is therefore maintained by the addition of fresh hydrochloric acid solution preferably flowing in counter-current to the direction of motion of the film. From the bath 22 the film passes into a washing bath 23 maintained fresh by the continual addition of fresh water flowing in counter-current as before. Loss of hydrochloric acid from the bath 22 is minimised by passing the film through nip rollers 24, 25. Further nip rollers 26, 27 free the film of surface water on leaving the bath 23 and thence the film passes into a bath 28 of plasticiser. It is important that the plasticiser should be such as to be able to plasticise the film adequately at the high speed of operation possible according to this invention. It has been found that a bath consisting of a solution of glycerol of a concentration of the order of 4% to 6% preferably about 5% works well for this purpose. The solution is kept up to strength by addition of further glycerol as required. From the bath 28 the film passes through nip rollers 29, 30 to drying rollers 31 similar to the drying rollers 21 previously referred to. From the drying rollers 31 the dried alginic acid film passes over conditioning rollers 32 which are located in a chamber, not shown in the drawing, in which the atmosphere is maintained conditioned at an atmospheric relative humidity of 65%.

In the instance cited, as a result of this treatment the final paper contained 78% alginic acid, 12% glycerol and 10% moisture. From the conditioning rollers 32 the material passes to a reel 33 on which it is wound.

It was found that in the above described operations the film was sufficiently strong in all stages to withstand operation of the machine at high speeds, the rate of progress being 100 ft. per minute.

It will be understood that this invention is by no means limited to the above example. The washing steps prior to the first drying are not essential. Coagulation and conversion may be conducted at temperatures other than 20° C. The concentrations of the baths employed may be varied.

Introducing this drying step and subsequently converting the partially dried calcium alginate film to alginic acid has been found to produce an alginic acid film which is not only strong enough in its wet state to permit a marked increase in the speed of operation but it has also been found that the final paper has an improved quality of toughness.

I claim:

1. A process for the continuous production of transparent alginic acid films comprising in combination the steps of continuously projecting a liquid film of sodium alginate solution having a viscosity between 30 and 200 centipoises when diluted to a test strength of 1% and 15° C., said solution being employed in a concentration of 6% to 8% sodium alginate, into a coagulating bath of calcium chloride solution having a concentration of 3% to 8% calcium chloride and thereby coagulating a film of calcium alginate, continuously drying said calcium alginate film until the solids content of the film is between 20% and 40% of its total weight, continuously leading said partially dried film through an acid bath containing mineral acid to effect conversion to alginic acid and thereafter washing and drying said alginic acid film.

2. A process as claimed in claim 1 wherein the mineral acid is hydrochloric acid.

3. A process as claimed in claim 1 wherein after washing the alginic acid film is plasticised by passage through a bath of glycerol solution of a strength between 4% and 6% prior to drying.

4. A process for the continuous production of transparent alginic acid films comprising in combination the steps of continuously projecting a liquid film of sodium alginate solution having a viscosity between 30 and 200 centipoises when diluted to a test strength of 1% and 15° C., said solution being employed in a concentration of 6% to 8% sodium alginate, into a coagulating bath of calcium chloride solution having a concentration of 3% to 8% calcium chloride and thereby coagulating a film of calcium alginate, continuously drying said calcium alginate film until the solids content of the film is between 20 and 40% of its total weight, continuously leading said partially dried film through an acid bath containing mineral acid to effect conversion to alginic acid and thereafter washing and drying said alginic acid film, the rate of travel of the film throughout said process being of the order of at least 100 feet per minute.

ROBERT CHARLES ROSE.

REFERENCES CITED

The following references are of record in the file of this patent:

UNITED STATES PATENTS

| Number | Name | Date |
|---|---|---|
| 1,778,688 | Reynard | Oct. 14, 1930 |
| 2,030,566 | Bonniksen | Feb. 11, 1936 |
| 2,319,168 | Speakman | May 11, 1943 |

FOREIGN PATENTS

| Number | Country | Date |
|---|---|---|
| 835,139 | France | Dec. 13, 1938 |